G. BECCARI.
APPARATUS FOR WORKING GARBAGE AND REFUSE OF TOWNS.
APPLICATION FILED MAR. 21, 1916.

1,329,105.
Patented Jan. 27, 1920.
2 SHEETS—SHEET 1.

INVENTOR:
Giuseppe Beccari
By Wm Wallace White
ATTY.

G. BECCARI.
APPARATUS FOR WORKING GARBAGE AND REFUSE OF TOWNS.
APPLICATION FILED MAR. 21, 1916.
1,329,105.
Patented Jan. 27, 1920.
2 SHEETS—SHEET 2.
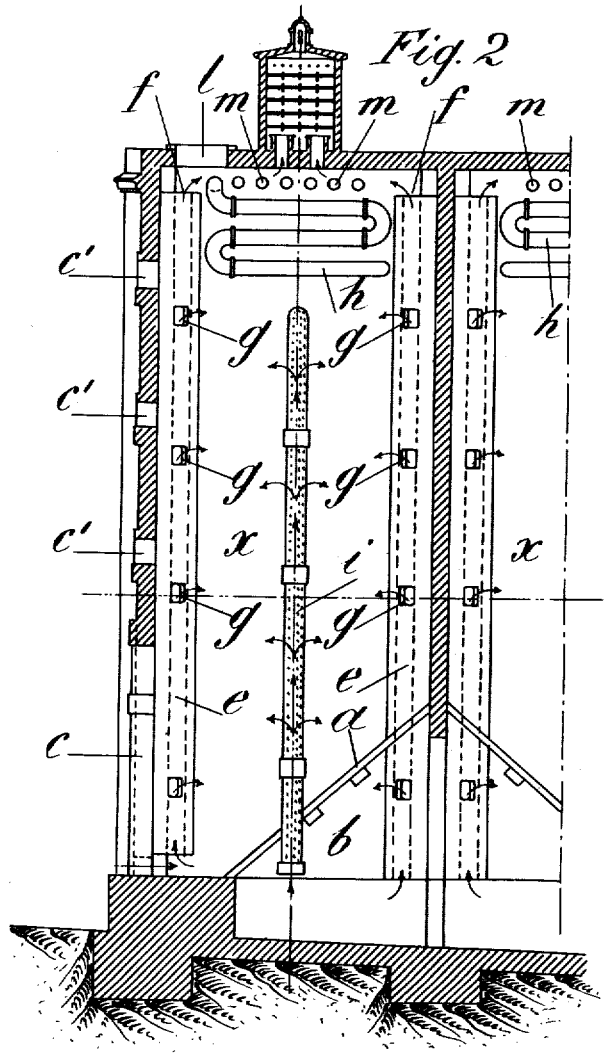
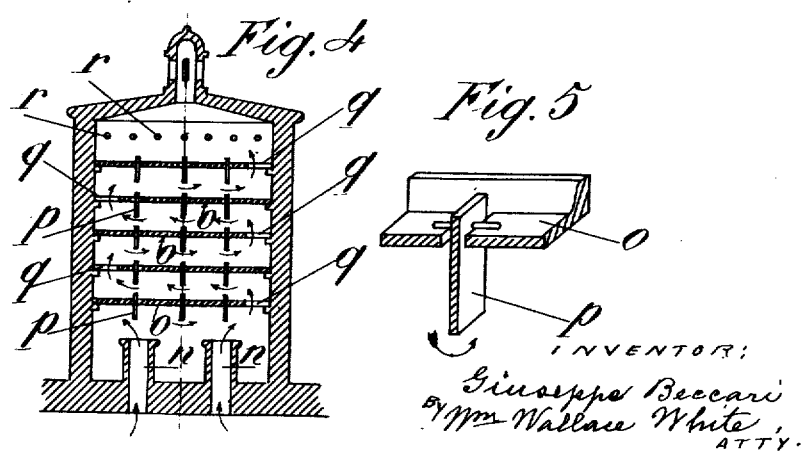

UNITED STATES PATENT OFFICE.

GIUSEPPE BECCARI, OF FLORENCE, ITALY.

APPARATUS FOR WORKING GARBAGE AND REFUSE OF TOWNS.

1,329,105.   Specification of Letters Patent.   Patented Jan. 27, 1920.

Application filed March 21, 1916. Serial No. 85,567.

*To all whom it may concern:*

Be it known that I, GIUSEPPE BECCARI, doctor, subject of the King of Italy, residing at Florence, Italy, have invented new and useful Improvements in Apparatus for Working Garbage and Refuse of Towns, of which the following is a specification.

The invention relates to a process of working garbage and refuse of towns. The object of the invention is to establish a succession of steps, whereby the refuse of towns will be deprived of dangerous micro-organisms, of stinking gases and of such chemicals as are very useful in agriculture.

A further object of the invention is to use the cleaned mass as burning material, by previously composing the same into cakes in combination with adhesive and burning material.

With these objects in view, the invention is necessarily connected to a form of apparatus, and, therefore, it will be understood with reference to the annexed drawings in which:—

Fig. 2 is a vertical section on line A—B of Fig. 1;

Fig. 4 represents a small tower or chimney for the top of the main apparatus in vertical section; and Fig. 5 is an enlarged detail view of part of one of the horizontal perforated diaphragms and one of the vertical plates associated therewith, the same being shown in perspective and broken away.

Figure 1:
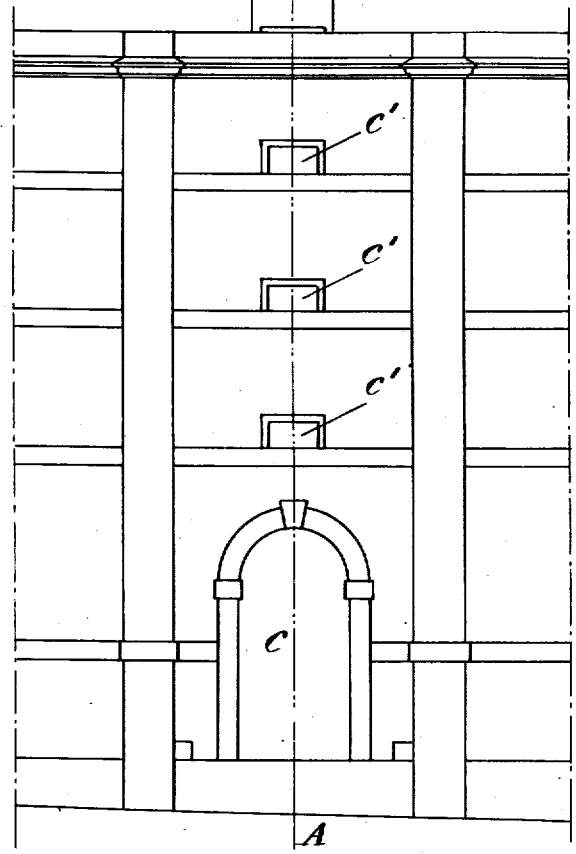
Figure 1 is a front elevation of part of the apparatus.
Figure 3:
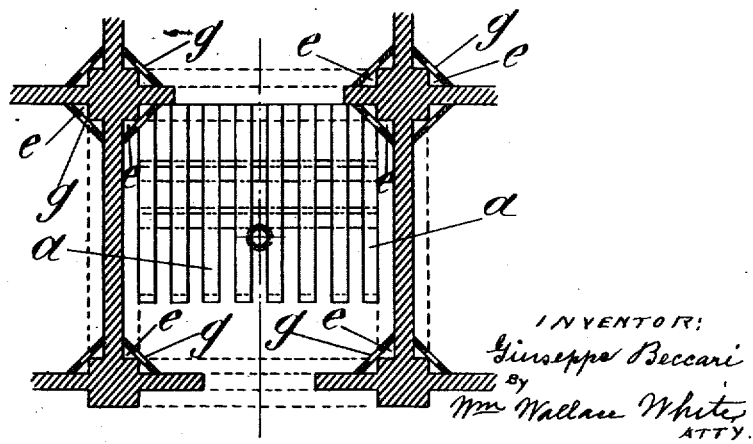
Fig. 3 is a horizontal section through part of the apparatus.

Referring particularly to Figs. 1 to 3 inclusive, it will be observed that the apparatus consists primarily of a rather high building or tower of masonry having a number of fermentation chambers $x$ of convenient shape and dimensions formed therein. At the bottom of each chamber, an inclined grating $a$ is provided and has a sub-passage $b$, which serves for the discharge of the fermented substances and permits access to the bottom of the chamber for the purpose of superintending the working of the apparatus.

In one of the exterior walls of the tower, a main discharging door $c$ and other smaller doors $c'$ for observation and examination purposes are provided.

Air conduits extend vertically from the bottom to the top of each chamber, of said conduits there are shown five in each chamber, *i. e.*, the conduits $e$ at the corners and air-pipe $i$ at the center of the chamber.

Each conduit $e$ has openings $g$ at different heights to discharge air into the chamber, the pipe $i$ is preferably provided with a plurality of discharging holes for the same purpose. The air enters the conduits through their lower end. Close under the ceiling of each chamber there are arranged heat-collectors $h$, preferably in the form of serpentine pipes filled with water in order to utilize the heat produced by fermentation, which heat may serve both to dry the products already worked and for other purposes, such as to provide hot water for baths, lavatories, steam-boilers, or the like.

At the upper end of each chamber, there is provided a water-closing trap-door $l$ which permits the introduction of the refuse, the lower part of the chamber having, as has already been pointed out, a discharging door $c$. Near the deck of the covering of the chamber horizontal metal tubes $m$ are placed and constitute radiators or condensers of the aqueous vapor, in order to bring about a kind of self-watering of the fermented mass.

The several fermentation chambers, which are connected in series, may be provided individually, at their tops, as shown in Fig. 4, with small towers or chimneys for the fixation of the gaseous ammoniacal compounds evolved by fermentation.

These small towers may be of varied structure and dimensions. Fig. 4 simply represents an example thereof. As will be seen, each small tower has its lower part in communication with the empty space of the underlying chamber through the medium of the upwardly projecting conduits $n$. In its interior, each small tower is provided with horizontal, perforated diaphragms $o$, through which pass plates $p$ which form drip-plates for liquids which condense above, so that they may drip down from diaphragm to diaphragm. This feature of the construction is shown clearly in Fig. 5.

In addition to this, the diaphragms are provided with staggered holes $q$, which will impart to the gaseous current a serpentine course, as is indicated by the arrows in Fig. 4 of the drawings.

The fermentation chambers of plants employed for purposes of agriculture and for towns and places where the price of land is moderate may be greatly reduced in depth, as compared with those shown in the annexed drawings, whereas the ground-plan of the chambers should be more extensive in area. Such chambers will be supplied with gratings, almost flush with the ground, but they will not be provided with sub-passages, and the discharge will be effected through the doors.

Having thus described the fermentation chambers, the manner of proceeding in order to obtain the desired economic and hygienic results will now be specified.

The manure or refuse from the town is conveyed, by means of a hand-cart, wheelbarrow, lift, or any other suitable means, onto the roof of the tower, which may be so arranged as to form a platform. After the trap-doors of the chambers have been opened, the refuse is introduced into the empty spaces of said chambers and sprinkled with water or sewage, after having been deposited in layers, and it may be strewn with alkaline powders, or such as are both alkaline and earthy (ashes, carbonate of sodium, carbonate of calcium, etc.) in order to afford the bases for nitrification. After the introduction of these substances the chambers are closed.

Owing to the air which has access to it from underneath the grating and from the conduits and small channels, the manure or rubbish introduced begins to ferment. Very soon the temperature of the mass contained in this space, which though closed is still accessible to air, rises to between 60° and 70° centigrade. This temperature is the most favorable to the development of the micro-organisms apt to cause the transformation of the nitrogenous and hydrocarbonaceous substances, while, at this temperature, the bacteria of denitrification, the typhoid bacillus, the vibrio of Asiatic cholera, the streptococcus, the staphylococcus pyogenes and likewise the diplococcus of pneumonia, and the bacilli of diphtheria, of influenza, of tetanus, etc., do not live in a moist and steamy environment.

The degree of moisture of the mass may easily be regulated by means of the waterings effected during the first twenty days of fermentation with pumps or ordinary watering utensils. In the chambers the fermentation is made to proceed regularly and uniformly throughout, thus imparting homogeneity to the entire mass, and after forty or fifty days, at the latest, the fermentation is complete.

In order that the volatile ammoniacal compounds produced during these processes of oxidation may not pass off into the air and contaminate it, and to obviate losses of combined nitrogen, they are made to pass first of all into the small tower or serpentine chimney already described (Fig. 4); on their way these gases pass over the diaphragms $o$ and over the plates $p$, etc., upon which are located substances which react in connection with the ammoniacal gases. These substances are: sulfate of iron, superphosphates, plaster moistened with solutions of sulfuric or hydrochloric acid or any compound suitable for producing the salification of, or giving stability to, the carbonate and sulfid of ammonia produced by the fermenting mass. Vegetable earth may also be placed in the small tower. In this case the ammoniacal nitrogen is fixed to the bases contained in the earth by the bacteria of nitrification.

The fermented matter may be used directly for manure in agriculture and may likewise be employed for fuel in substitution for cakes of peat, lignite, etc. In this case, before being formed into cakes, it should be sifted and washed in tanks containing water. After this, it should be dried and mixed with coal-dust and grit and then pressed into cakes, which, when dry, are used for fuel. From the concentrated rinsings and from the earthy substances drawn off, the nitroazotic substances which may be employed in agriculture or in various industries, may be extracted.

Having thus described the invention, what it is desired to claim and to secure by Letters-Patent is:

1. A manure and refuse fermentation apparatus comprising a building structure having a chamber therein for the reception of the material to be subjected to fermentation, and vertical air conduits rising from the bottom part of the chamber along the vertical walls thereof, and having discharge openings communicating with the chamber.

2. A manure and refuse fermentation apparatus comprising a building structure having a chamber therein for the reception of the material to be subjected to fermentation, vertical air conduits rising from the bottom part of the chamber along the sides of the latter and having discharge openings at various points.

3. A manure and refuse fermentation apparatus comprising a building structure having a chamber therein for the reception of the material to be subjected to fermentation, a tower surmounting the said structure and being in communication with the top of the chamber, horizontal diaphragms positioned in the said tower and adapted to support substances for the fixation of the gaseous products from the chamber passing through the tower, and depending drip plates supported by each diaphragm.

4. A manure and refuse fermentation apparatus comprising a building structure having a chamber therein for the reception of the material to be subjected to fermentation, and a radiator formed by a series of tubes disposed in the top part of the chamber and adapted to have comparatively cold fluid pass therethrough.

5. An apparatus for working garbage and refuse of towns, comprising a closed chamber to receive said material, a charging door at the top and a discharging door near the bottom of said chamber, a grating at the floor of said chamber for access of air, air pipes extending vertically throughout said chamber, openings in said pipes to admit air at different levels of said chamber, and inspection and controlling openings at different levels of the walls of said chamber.

6. An apparatus for working garbage and refuse of towns, comprising a closed chamber to receive said material, a charging door at the top and a discharging door at the bottom of said chamber, a grating at the floor of said chamber for access of air, inspection and working holes at different levels in the walls of said chamber, and serpentine water-pipes arranged at the top of said chamber.

7. An apparatus for working garbage and refuse of towns, comprising a closed chamber to receive said material, a charging door at the top and a discharging door near the bottom of said chamber, a grating at the bottom of said chamber for access of air, a tower at the top of said chamber with staggered compartments supporting a substance to receive and fix ammonia, openings at the bottom of said tower setting its interior in communication with said chamber, and a chimney-piece at the top of said tower to discharge worked gases into the open air.

In testimony whereof I have signed my name to this specification in the presence of two subscribing witnesses.

Dott. GIUSEPPE BECCARI.

Witnesses:
  BENNO N. JANNUCA,
  CHARLES L. BOLOGNEZ.